Oct. 27, 1925.
A. A. TEEPLE
LOCK NUT
Filed May 11, 1925
1,559,201
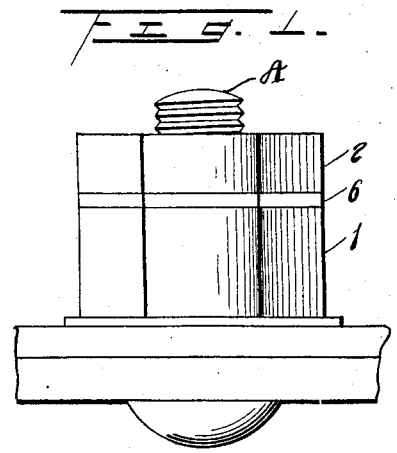
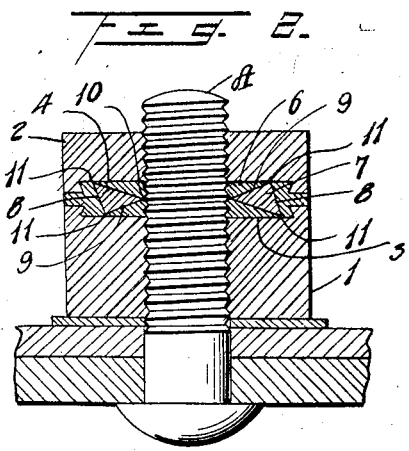
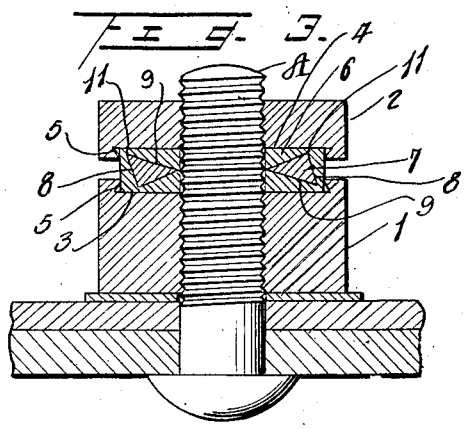
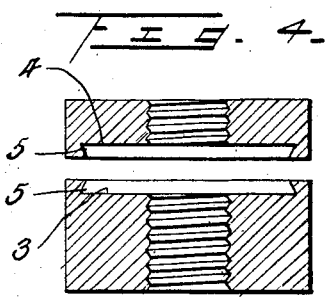
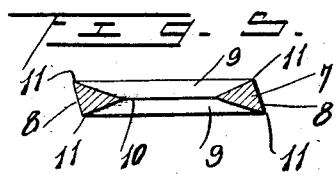
Inventor
A. A. Teeple Patented Oct. 27, 1925.

1,559,201

UNITED STATES PATENT OFFICE.

ALFRED A. TEEPLE, OF SOUTH PLAINFIELD, NEW JERSEY.

LOCK NUT.

Application filed May 11, 1925. Serial No. 29,512.

*To all whom it may concern:*

Be it known that I, ALFRED A. TEEPLE, a citizen of the United States, residing at So. Plainfield, in the county of Middlesex and State of New Jersey, have invented certain new and useful Improvements in Lock Nuts; and I do hereby declare the following to be a full, clear, and exact description of the invention, such as will enable others skilled in the art to which it appertains to make and use the same.

The invention relates to a means for locking a nut or bolt and has for its object the provision of means by which an effective lock for the nut is provided to prevent unscrewing of the nut relatively to the bolt by jarring or vibration, and it will permit removal of the nut from the bolt by the use of a wrench without disfiguring the nut or the bolt.

The invention will be described in detail hereinafter and will be found illustrated in the accompanying drawings, in which—

Figure 1 is a view in elevation of a bolt having the improved lock nut thereon,

Figure 2, a central vertical sectional view of Figure 1 showing the position of the parts when the nut is locked on the bolt, Figure 3, a similar view showing the parts before the lock is effected, Figure 4, a central longitudinal sectional view of the two members of the nut, and Figure 5, a cross sectional view of the hard metal insert for the locking disk.

In the drawings similar reference characters will be used to designate corresponding parts throughout the several views.

The improved nut lock is shown in connection with a conventional bolt A and comprises a nut having two members 1 and 2 which may be as shown in the drawings of unequal thickness, or may obviously be of the same thickness. The abutting faces of the members 1 and 2 are formed with recesses 3 and 4 respectively, the side walls of the recesses being undercut as shown at 5.

The locking member comprises a disk 6 of a soft metal such as lead and having enclosed therein an insert 7 of a harder metal, such as steel, having its side edges inclined as shown at 8 and its upper and lower side formed recess by being inclined toward one another as shown at 9 and converging to a substantially sharp edge at the middle opening thereof, said sharp edge being designated 10. The inclined surfaces 9 and the inclined outer edge 8 form other sharp edges 11 at the top and bottom of the outer edge of the disk.

In operation, the member 1 of the nut is first screwed down on the bolt, or other threaded fastening, in the position shown in the drawing, and the disk or ring 6 in which is the insert 7 is then placed on the bolt, seating in the recess 3. The member 2 is then screwed on to the bolt and its recess 4 receives the ring or disk 6 and by continuing the screwing action of member 2, the ring or disk 6 is compressed so that the metal thereof engages frictionally the threads of the bolt or other threaded fastening A and the walls of the recesses including the undercut portions 5 and flows out between the two members, the assembled lock nut appearing as shown in Figure 2 when the parts are finally assembled.

It will be apparent that the inclined faces 9 of the insert 7 will serve to definitely direct the flow of the soft metal of the disk or ring 6 towards the threads of the bolt A, the sharp edges 11 cutting through the soft metal of the disk or ring 6 to confine a portion of the soft metal in the recesses formed by the inclined surfaces 9 and causing the metal retained within said recesses to firmly engage the bottom walls of the recesses 3 and 4 and the threads of the bolt or other threaded fastening A, while the soft metal of the disk or ring 6 exteriorly of the side edges 8 of the insert 7 will be definitely directed into engagement with the undercut side walls of said recesses 3 and 4, and the surplus metal will flow out between the members 1 and 2 and engage the surfaces of said members exteriorly of the recesses 3 and 4.

By this operation it will be apparent that an effective friction block for the nut comprising the members 1 and 2 is accomplished and that this lock will prevent casual movement of the nut relatively to the bolt A, but will permit removal of the members 1 and 2 by the use of a wrench without disfiguring either the bolt or the nut, so that the nut may be again used.

What is claimed is:—

1. A lock nut comprising complemental threaded members having recesses in their abutting faces, and a disk of soft metal seated in said recesses and normally thicker than the combined depth thereof compressed into frictional engagement with the walls of the recesses and the threads of the bolt by relative movement of said members toward each other, and means within the disk aforesaid to direct the movement of the metal thereof towards said walls and threads.

2. A lock nut comprising complemental threaded members having recesses in their abutting faces, a disk of soft metal seated in said recesses and normally thicker than the combined depth thereof, and an insert in said disk comprising a disk of hard metal having its upper and lower sides recessed, said softer metal disk being adapted to be compressed into frictional engagement with the walls of said recesses and the threads of a bolt by relative movement of the nut members towards each other, the recessed surfaces of the hard metal disk compressing the metal of the soft metal disk into engagement with said threads.

3. A lock nut comprising complemental threaded members having recesses in their abutting faces, a disk of soft metal seated in said recesses and adapted to be compressed into the walls thereof and with the threads of a bolt by relative movement of said members towards each other, and an insert in said disk comprising a recessed disk of hard metal and having inclined sides to direct the movement of the metal of the soft metal disk into engagement with the walls and the threads aforesaid.

In testimony whereof I affix my signature.

ALFRED A. TEEPLE.